Aug. 31, 1948.  A. P. DRIGGS  2,448,088
BUNNY-CAT
Filed July 31, 1946
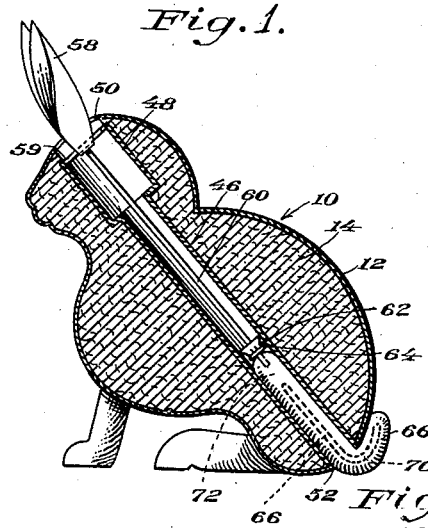
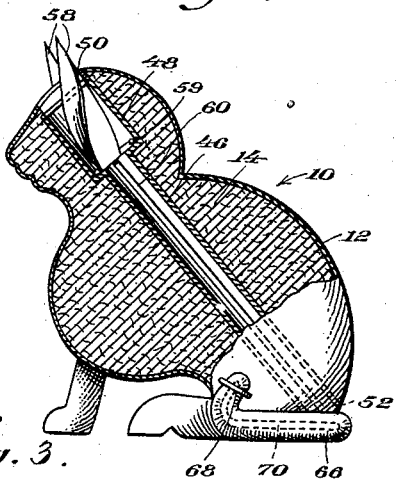
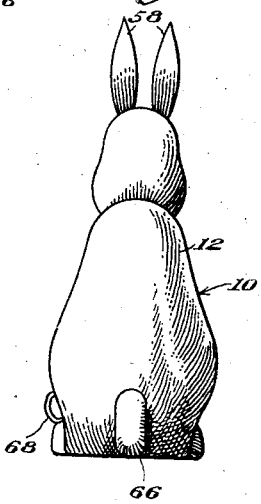
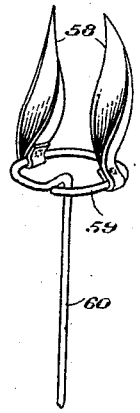
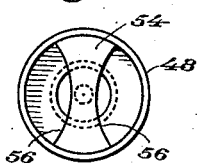
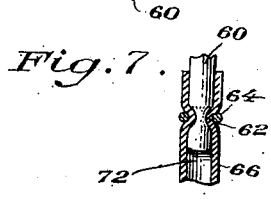
INVENTOR.
Anna Pearl Driggs:
BY Victor J. Evans & Co.
ATTORNEYS Patented Aug. 31, 1948

2,448,088

UNITED STATES PATENT OFFICE 2,448,088

BUNNY-CAT

Anna P. Driggs, Colfax, Calif.

Application July 31, 1946, Serial No. 687,245

4 Claims. (Cl. 46—151)

This invention relates to toy animals, and is a division of my application for Bunny cat, filed November 9, 1945, Serial No. 627,608.

An object of this invention is to provide a stuffed toy animal having adjustable ears and tail, whereby the length thereof may be changed so that the animal will simulate a cat or rabbit.

Another object of the invention is to provide a toy animal that is simple in operation, inexpensive to manufacture, and can be sold at a reasonable cost.

With these and other objects in view, the invention consists of the novel details of construction, arrangement and combination of parts more fully hereinafter described, claimed and illustrated in the accompanying drawings in which:

Figure 1 is a vertical section of an embodiment of the invention, as a rabbit;

Figure 2 is the same, as a cat;

Figure 3 is a rear view;

Figure 4 is a perspective view of the ears and tube mounting means therefor;

Figure 5 is a perspective view of the ears and operating means therefor;

Figure 6 is a top plan view of Figure 4 with the means shown in Figure 5 removed, and Figure 7 is a fragmentary sectional view of the connection between the tail and operating rod for the ears.

Referring more in detail to the drawings, the numeral 10 depicts an animal body which, except for the position of the ears and tail, would resemble in appearance a cat or a rabbit. To simulate a rabbit, the ears and tail will assume the positions shown in Figure 1, and to simulate a cat, the ears and tail will assume the positions shown in Figure 2.

The body 10 is made of cloth having a heavy nap or fur-like cloth 12, and is stuffed with cotton, sawdust, fiber or similar materials 14, as previously described. When the material 12 for the body 10 is cut, it is so shaped that when stuffed, will assume in its outward contour, the simulated form of a cat or rabbit.

Prior to stuffing the body 10, a tube 46 having a circular socket or pocket 48 on the forward end thereof is fastened to openings 50 and 52 in the head and rear portions of the body 10 respectively, or slots may be cut in the material 44 for each individual ear, if desired. The pocket 48 is provided with a divider or spacer 54 having concave sides 56 which space the ears 58 which are secured to the flat loop 59 of the control rod 60 which is slidably mounted in the tube 46. The ears are secured to the loop 59 by having their lower ends fastened to the ears by any well known fastening means.

The tube 46 may be made of metal, plastic, linoleum or similar materials, and the ears made from materials already described, the control rod being made of a heavy stiff wire or the like.

The lower end of the rod 60 is provided with a groove 62, whereby fastening means 64 made of wire, cord or similar materials retains the end of the tail 66 in connected relation with the rod 60. The tail 66 is made of the same material as the body 10, and is likewise stuffed with a filler of the same material as the body.

The control rod 60 is made of a suitable length, so that when the ears 58 are fully extended, as shown in Figure 1, when the animal simulates a rabbit, the tail is short and in Figure 2, when the ears are in full retracted position, the tail is long, to simulate a cat.

The change of the specie of the animal from a rabbit to a cat or vice versa is accomplished by pushing the tail 66 inwardly, thereby pushing the ears 59 outwardly by means of the rod 60 to assume the positions shown in Figure 1, or pulling the tail 66 outwardly, thereby drawing or pulling the ears 58 inwardly to assume the positions shown in Figure 2, as previously described. When the tail 66 is in full extended position, it is retained in contact with the body by means of a loop 68, which may be made of elastic cord or similar materials.

To make the cat tail long enough in Figures 1 and 2, without making the rabbit tail too long, a heavy wire 70 is positioned longitudinally along the center line of the tail 66. The wire 70 is shorter than the cloth of the tail, and the tail is stuffed only to the end of the wire, leaving the space 72 between the stuffing and the rod 60. This limber space 72 between the end of the wire and the rod, as previously described, permits the cat tail to be turned to one side.

There is thus provided, a toy animal which by its peculiar structure can be made to simulate a rabbit or a cat, and it is believed that the operation thereof will be clear to those skilled in the art, from the foregoing description, when taken in conjunction with the drawings accompanying the specification.

It is also to be understood that various changes in materials, combinations and arrangements of the various parts can be indulged in, provided they fall within the spirit of the invention and the scope of the appended claims.

Having thus described the invention, what is claimed as new and desired to be secured by Letters Patent is:

1. A figure toy, comprising a stuffed body, a tube having a socket on the end thereof mounted within said body, ears movable within said socket, a tail movable within said tube, and means connecting the ears and the tail.

2. The invention as in claim 1 wherein the means for connecting the ears and tail comprise a rod having a loop at one end thereof, to which the ears are secured, and a groove at the other end thereof, to which the tail is secured.

3. The invention as in claim 1, wherein the socket is provided with means for properly spacing said ears.

4. The invention as in claim 1, wherein the tail is provided with stiffening means which is shorter than the length of said tail, to permit bending thereof.

ANNA P. DRIGGS.

REFERENCES CITED

The following references are of record in the file of this patent:

UNITED STATES PATENTS

| Number | Name | Date |
|---|---|---|
| 1,591,661 | Dinsdale | July 6, 1926 |

FOREIGN PATENTS

| Number | Country | Date |
|---|---|---|
| 141,307 | Great Britain | Apr. 15, 1920 |